United States Patent
Kim et al.

(10) Patent No.: US 9,419,477 B2
(45) Date of Patent: Aug. 16, 2016

(54) WIRELESS POWER TRANSMITTER AND WIRELESS POWER RECEIVER

(71) Applicant: Samsung Electronics Co., Ltd., Gyeonggi-do (KR)

(72) Inventors: Joon-Il Kim, Seoul (KR); Hong-Kweun Kim, Gyeonggi-do (KR); Se-Ho Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 131 days.

(21) Appl. No.: 14/075,440

(22) Filed: Nov. 8, 2013

(65) Prior Publication Data

US 2014/0125278 A1    May 8, 2014

(30) Foreign Application Priority Data

Nov. 8, 2012 (KR) .................. 10-2012-0126309
Oct. 28, 2013 (KR) .................. 10-2013-0128727

(51) Int. Cl.
*H02J 17/00* (2006.01)
*H02J 5/00* (2016.01)

(52) U.S. Cl.
CPC ........ *H02J 17/00* (2013.01); *H02J 5/005* (2013.01)

(58) Field of Classification Search
None
See application file for complete search history.

(56) References Cited

U.S. PATENT DOCUMENTS

| | | | |
|---|---|---|---|
| 7,791,432 B2 * | 9/2010 | Piazza et al. | 333/186 |
| 8,569,914 B2 | 10/2013 | Karalis et al. | |
| 9,077,193 B2 * | 7/2015 | Uramoto et al. | |
| 2010/0321132 A1 * | 12/2010 | Park | 333/186 |
| 2012/0193996 A1 * | 8/2012 | Ryu et al. | 307/104 |
| 2013/0119927 A1 * | 5/2013 | Partovi | 320/108 |
| 2013/0193770 A1 * | 8/2013 | Krishna et al. | 307/104 |

* cited by examiner

*Primary Examiner* — Leigh Garbowski
(74) *Attorney, Agent, or Firm* — The Farrell Law Firm, P.C.

(57) ABSTRACT

Disclosed is a wireless power transmitter that includes a resonator that provides charging electric power to a wireless power receiver and a metal layer spaced apart from the resonator by a preset interval, with a line width of the resonator being smaller than the preset interval between the resonator and the metal layer.

18 Claims, 5 Drawing Sheets

WIRELESS POWER TRANSMITTER AND WIRELESS POWER RECEIVER

PRIORITY

This application claims priority under 35 U.S.C. §119(a) to Korean Application Serial No. 10-2012-0126309 and Korean Application Serial No. 10-2013-0128727, filed in the Korean Intellectual Property Office on Nov. 8, 2012 and Oct. 28, 2013, respectively, the entire content of each of which are incorporated herein by reference.

BACKGROUND OF THE INVENTION

1. Field of the Invention

The present invention generally relates to a wireless power transmitter and a wireless power receiver.

2. Description of the Related Art

Mobile terminals such as a mobile phone or a Personal Digital Assistant (PDA) are powered by a rechargeable battery, and a user of a mobile terminal uses a separate charging device to charge the rechargeable battery in order to supply electrical energy to the mobile terminal. In general, the charging device and the battery include respective contact terminals, and a user makes the contact terminals contact each other to electrically connect the charging device with the battery.

However, in the contact type charging method, since the contact terminals are external and are exposed to an outside environment, the contact terminals may be easily contaminated by foreign substances. Accordingly, the battery charging may not be correctly performed. Further, corrosion occurs when the contact terminal is exposed to moisture, making it impossible to achieve a normal battery charging.

In order to solve the above-mentioned problems, a wireless charging or a non-contact charging technology has been recently developed and used for electronic devices.

The wireless charging technology transmits and/or receives electrical power in a wireless manner, and provides a system that can automatically charge the battery by positioning the mobile phone on a charging pad without connecting the mobile phone to a separate charging connector. The wireless charging system is known to the public as being used with a wireless electric toothbrush or a wireless electric razor. The wireless charging technology can provide a waterproof function by charging electronic products in a wireless manner, and can improve portability of the electronic device since a wired charging device is not necessary. It is expected that technologies related to the wireless charging technology will be greatly advanced with the oncoming electric vehicle age.

Such wireless charging technology includes an electromagnetic induction scheme using a coil, a resonance scheme using resonance, and a RF/microwave radiation scheme converting electrical energy into microwaves to transfer the energy via the microwaves.

It is considered up to now that the electromagnetic induction scheme is mainstream, but in the future it is expected that all electronic products will be wirelessly charged, anytime and anywhere, based on recent successful experiments for wirelessly transmitting power to a destination located dozens of meters away, using microwaves.

A power transmission method through the electromagnetic induction corresponds to a scheme of transmitting power between a first coil and a second coil, by inducing an alternating current in the second coil of a receiving side when a magnetic field is created around the first coil of a transmitter side. The magnetic field is created by applying an alternating current in the first coil of the transmitter side, and the receiver side generates energy by an alternating current being induced in the second coil by the alternating magnetic field, i.e. by a phenomenon referred to as magnetic induction, with the power transmission method using magnetic induction to provide a high energy transmission efficiency.

As the resonance scheme, a system is known in which electrical power is wirelessly transferred using a resonance scheme power transmission principle referred to as coupled mode theory, even when the electronic device is located several meters away from the charging device. This wireless charging system employs a physic concept corresponding to resonance phenomenon akin to vibrating a wine glass at the same frequency of an adjacent tuning fork. Electromagnetic waves having electric energy are resonated instead of sounds. Since the resonated electric energy is directly transferred when there is a device having a resonance frequency and an unused part of the resonated electric energy does not propagate in the air but is reabsorbed in the electromagnetic field, i.e., electromagnetic waves, the resonated electric energy does not influence peripheral devices or a human's body, which is different from other electromagnetic resonance schemes.

In conventional wireless power transmitters and receivers the current carrying metal objects are located around a wireless power transmitter/receiver, the grounding effect of the metal objects may change the high frequency characteristic of a resonator included in the wireless power transmitter/receiver, or may cause the resonator to lose a function or characteristics that transmit or receive electric power at a specific frequency.

An electromagnetic shielding member may be employed in order to solve the above-mentioned problems, but products that include shielding members are more expensive to manufacture. Further, an efficiency of the resonator may be reduced and a resonance frequency thereof may be changed by high frequency characteristics of the shielding member.

SUMMARY OF THE INVENTION

The present invention has been made to at least partially solve, reduce, or remove at least one of the above problems and/or disadvantages relating to the related art, and to provide at least the advantages described below.

An aspect of the present invention provides a wireless power transmitter and/or a wireless power receiver which can prevent change in characteristics thereof caused by a peripheral metal object by minimally using the electromagnetic shielding member or eliminating the electromagnetic shielding member.

In accordance with an aspect of the present invention, a wireless power transmitter is provided that includes a resonator that provides charging electric power to a wireless power receiver and a metal layer spaced apart from the resonator by a preset interval, with a line width of the resonator being smaller than the preset interval between the resonator and the metal layer.

In accordance with another aspect of the present invention, a wireless poweer receiver is provided that includes a resonator that receives charging electric power from the wireless power transmitter and a metal layer spaced apart from the resonator by a preset interval, with a line width of the resonator being smaller than the preset interval between the resonator and the metal layer.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT INVENTION

Various example embodiments will now be described more fully with reference to the accompanying drawings in which some example embodiments are shown. Therefore, it should be understood that there is no intent to limit example embodiments to the particular forms disclosed, but on the contrary, example embodiments are to cover all modifications, equivalents, and alternatives falling within the scope of the disclosure.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present invention. As used herein, the term "and/or" includes any and all combinations of one or more of the associated listed items.

The terms used in this application are for the purpose of describing particular embodiments only and are not intended to be limiting of the present invention. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the same meanings as the contextual meanings in the relevant field of art, and are not to be interpreted to have ideal or excessively formal meanings unless clearly defined in the present specification.

Figure 1:
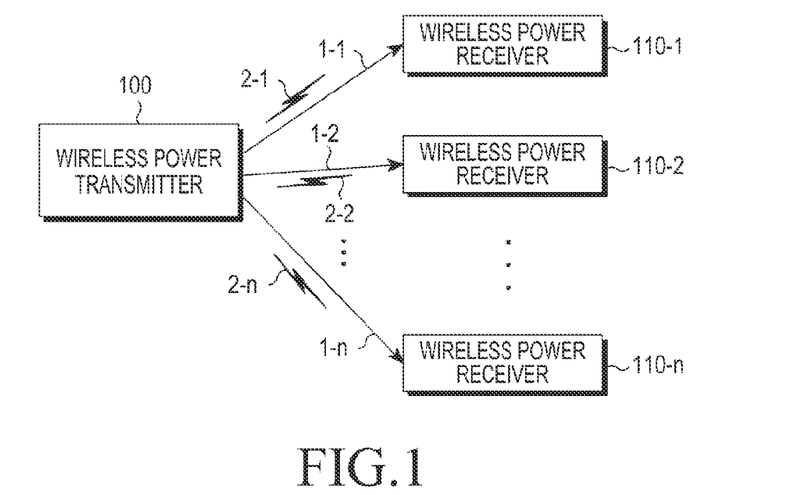
FIG. 1 illustrates components of a wireless charging system of the present invention.

FIG. 1 illustrates components of a wireless charging system of the present invention. As illustrated in FIG. 1, a wireless charging system includes a wireless power transmitter 100 and one or more wireless power receivers 110-1, 110-2, and 110-n.

The wireless power transmitter 100 can transmit power 1-1, 1-2, and 1-n to the one or more wireless power receivers 110-1, 110-2, and 110-n, respectively. The wireless power transmitter 100 may wirelessly transmit the power 1-1, 1-2, and 1-n to only wireless power receivers authenticated through a preset authentication procedure.

The wireless power transmitter 100 may be wirelessly connected to the one or more wireless power receivers 110-1, 110-2, and 110-n. For example, the wireless power transmitter 100 may wirelessly transmit power to the one or more wireless power receivers 110-1, 110-2, and 110-n through electromagnetic waves.

The one or more wireless power receivers 110-1, 110-2, and 110-n may receive wireless power from the wireless power transmitter 100 to charge a battery provided in the electronic device. Further, the one or more wireless power receivers 110-1, 110-2, and 110-n may transmit messages 2-1, 2-2, and 2-n including a request for wireless power transmission, information required for wireless power reception, information on states of the wireless power receivers 110-1, 110-2, and 110-n, or information, i.e., control information, for controlling the wireless power transmitter 100, to the wireless power transmitter 100. Likewise, the wireless power transmitter 100 may transmit messages including information on a state of the wireless power transmitter 100, control information for controlling the wireless power receivers 110-1, 110-2, and 110-n, and the like, to the wireless power receivers 110-1, 110-2, and 110-n.

Further, the one or more wireless power receivers 110-1, 110-2, and 110-n may transmit messages indicating a respective charging state thereof to the wireless power transmitter 100.

The wireless power transmitter 100 may include a display unit 214 (FIG. 2) that displays a state of each of the wireless power receivers 110-1, 110-2, and 110-n based on the message received from each of the wireless power receivers 110-1, 110-2, and 110-n. Further, the display unit 214 may also display a time expected to be spent until each of the wireless power receivers 110-1, 110-2, and 110-n is completely charged.

The wireless power transmitter 100 may transmit a control signal or control message that disables a wireless charging function to the one or more wireless power receivers 110-1, 110-2, and 110-*n*. The wireless power receivers having received the disable control signal of the wireless charging function from the wireless power transmitter 100 may disable the wireless charging function.

Figure 2:
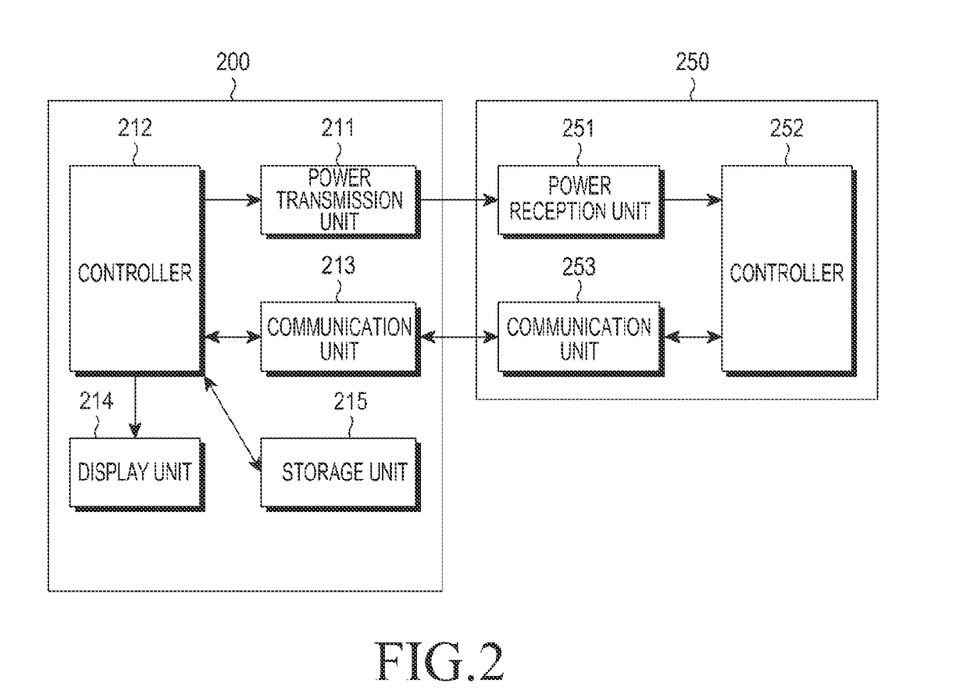
FIG. 2 illustrates components of a wireless power transmitter and a wireless power receiver according to an embodiment of the present invention.

FIG. 2 illustrates components of a wireless power transmitter and a wireless power receiver according to an embodiment of the present invention.

As illustrated in FIG. 2, the wireless power transmitter 200 may include a power transmission unit 211, a controller 212, a communication unit 213, the display unit 214, and a storage unit 215. Further, a wireless power receiver 250 may include a power reception unit 251, a controller 252, and a communication unit 253.

The power transmission unit 211 provides power required by the wireless power transmitter 200 and wirelessly provides power to the wireless power receiver 250. Here, the power transmission unit 211 may provide power in a form of an Alternating Current (AC) waveform by converting Direct Current (DC) power into an AC waveform via an inverter. The power transmission unit 211 may be implemented in a form of an embedded battery or as a power reception interface that receives external power and supplies the received external power to the wireless power receiver 250.

The controller 212 controls an overall operation of the wireless power transmitter 200 using an algorithm, a program, or an application required for the control, with the algorithm, program or application being read from the storage unit 215. The controller 212 may be implemented in a form of a Central Processing Unit (CPU), a microprocessor, a mini computer, and the like.

The communication unit 213 of the wireless power transmitter 200 communicates with the communication unit 253 of the wireless power receiver 250 through a predetermined method.

The communication unit 213 of the wireless power transmitter 200 receives power information from the wireless power receiver 250. Here, the power information may include at least one of a battery capacity, a residual quantity of the battery, the number of charging cycles, a usage quantity, and a battery charging ratio of the wireless power receiver 250. Further, the communication unit 213 of the wireless power transmitter 200 may transmit a charging function control signal for controlling a charging function of the wireless power receiver 250. The charging function control signal may be a control signal for making the charging function enabled or disabled by controlling the power reception unit 251 of the particular wireless power receiver 250.

The communication unit 213 may receive signals from another wireless power transmitter (not shown) as well as the wireless power receiver 250.

The controller 212 of the wireless power transmitter 200 displays a state of the wireless power receiver 250 on the display unit 214 based on a message received from the wireless power receiver 250 through the communication unit 213. Further, the controller 212 may display an expected time until the wireless power receiver 250 is completely charged on the display unit 214.

Figure 3:
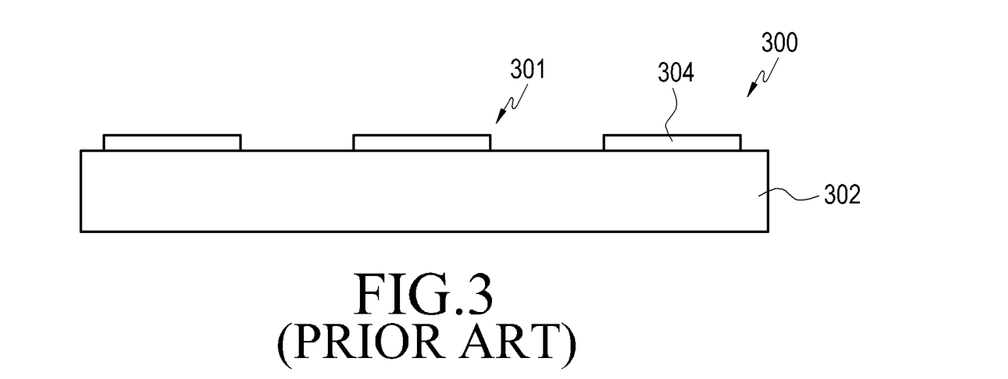
FIG. 3 illustrates a resonant structure of a power transmission unit or a power reception unit according to an embodiment of the present invention.

FIG. 3 is a view illustrating a resonant structure of a power transmission unit or a power reception unit 300 according to an embodiment of the present invention.

A resonant structure 300 of the power transmission unit or the power reception unit includes a resonator 301 and a mechanism 302. The resonator 301 is formed of a conductive metal material, and the mechanism 302 can be formed of an insulative material or a dielectric material.

When the resonant structure 300 is positioned on the metal object or the metal object is positioned around the resonator 301, a high frequency characteristics of the resonator 301 may be changed or a function by which the resonator 301 transmits power at a specific frequency, i.e., a preset resonant frequency, may be lost due to a grounding effect of the metal object.

Figure 4:
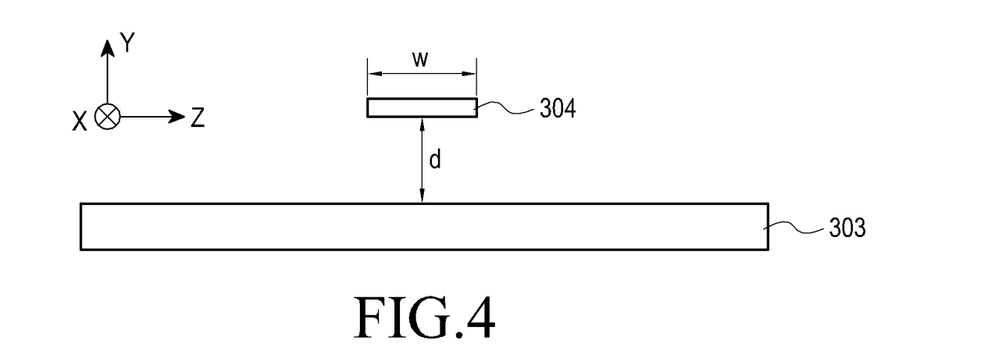
FIG. 4 is a view illustrating an effect of a metal object on characteristics of a resonator of the present invention.

FIG. 4 is a view illustrating an effect of a metal object on characteristics of a resonator of the present invention.

When a metal object 303 is located around the resonator 301, an impedance of the resonator 301 sharply decreases. The resonator 301 and the metal object 303 are spaced apart from each other by an interval d, i.e., a preset interval along a Y axis normal to an upper surface of the metal object 303. The resonator 301 is formed with a conductive line or a plurality of conductive lines 304 having a preset pattern, and each of the conductive lines 304 has a line width W along a Z axis parallel to the upper surface of the metal object 303. An X axis is parallel to a lengthwise direction of the conductive line 304.

When W/d≤1, an impedance $Z_0$ of the resonator 301 is determined by Equation (1).

$$Z_0 = \frac{60}{\sqrt{\varepsilon_0}} \ln\left(\frac{8d}{W} + \frac{W}{4d}\right) \quad (1)$$

In Equation (1), $\varepsilon_0$ denotes a dielectric permittivity of air.

W/d<1 corresponds to the line width W of the conductive line 304 constituting the resonator 301 being smaller than the preset interval d between a lower surface, i.e. a bottom surface, of the resonator 301 and an upper surface that acts as a grounding surface of the metal object 303 facing each other, in which case the impedance of the resonator 301 is slightly varied according to the preset interval d and/or the line width W of the resonator 301. When the impedance of the resonator 301 is maintained at a value within a predetermined range, the characteristics of the resonator 301 can be continuously maintained even when the resonator 301 is disposed above the metal object 303. That is, even when the resonator 301 is disposed above the metal object 303, high frequency characteristics of the resonator 301, or a function or an efficiency by which the resonator 301 transfers power at a specific frequency, can be maintained within a critical range, i.e., a designed efficiency±allowable error, e.g., 0~5%, 5~10%, 10~15%, 15~20% or the like of the designed efficiency.

When W/d≥1, an impedance $Z_0$ of the resonator 301 is determined by Equation (2).

$$Z_0 = \frac{120\pi}{\sqrt{\varepsilon_0}\,[W/d + 1.393 + 0.667\,\ln(W/d + 1.444)]} \quad (2)$$

W/d≥1 corresponds to line width W of the conductive line 304 constituting the resonator 301 being larger than the preset interval d between the lower surface (bottom surface) of the resonator 301 and the upper surface (grounding surface) of the metal object 303 facing each other, in which case the impedance of the resonator 301 decreases when the preset interval d decreases and the line width W of the resonator 301 increases. When the impedance of the resonator 301 decreases, an inductance value of the resonator 301 decreases. The decrease in the inductance value causes the resonator 301 to lose characteristics of transferring power by coupling the resonator 301 to the resonator, that is, the resonator being used for reception, of the wireless power receiver.

Figure 5:
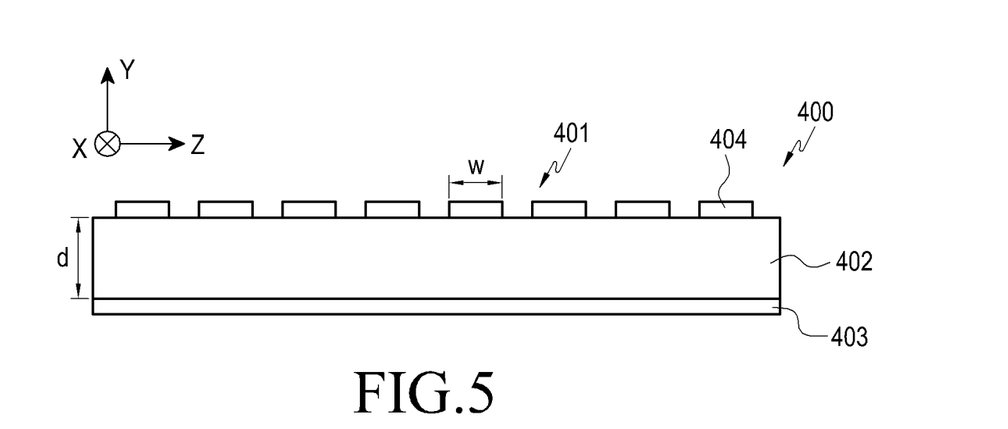
FIG. 5 is a view illustrating a resonant structure of a power transmission unit or a power reception unit according to another embodiment of the present invention.

FIG. 5 is a view illustrating a resonant structure of a power transmission unit or a power reception unit according to an embodiment of the present invention.

A resonant structure 400 of the power transmission unit or the power reception unit includes a resonator 401, a mechanism, i.e. substrate, 402, and a metal layer 403.

The resonator 401 is formed with a conductive line or conductive lines 404 having a preset pattern, such as a loop and a spiral, and each of the conductive lines 404 has a line width of W along a Z axis parallel to an upper surface of the metal layer 403. An X axis is parallel to a lengthwise direction of the conductive line 304. The resonator 401 has a pattern in which the conductive lines 404 are disposed at a regular or irregular interval along the Z axis The resonator 401 may be formed of a conductive metal such as gold, silver, copper, iron, aluminum, titanium, platinum and alloys thereof. The resonator 401 may be directly laminated on an upper surface of the mechanism 402. The line width of the resonator 401 may be equal to or less than 4.0 mm. The interval between the conductive lines along the Z axis may be equal to or less than 4.0 mm.

The resonator 401 is formed on an upper surface of the mechanism 402. The mechanism 402 may be a Printed Circuit Board (PCB), and may be formed of an insulative material or dielectric material such as Flame Retardant 4 (FR4), polyolefin, Polyvinyl Chloride (PVC), polyethylene, polyester, polyurethane, and polyamide. As another example, only an air layer may be provided between the resonator 401 and the metal layer 403, and a combination of an insulating layer, i.e., dielectric layer, and the air layer may be provided between the resonator 401 and the metal layer 403. In this example, the resonator 401 is directly laminated on the upper surface of the mechanism 402.

The metal layer 403 may be laminated on an entirety or a part of a lower surface of the mechanism 402, and may have a flat plate shape having no pattern. The metal layer 403 may be connected to or may not be connected to a grounding surface. The metal layer 403 may be formed of a conductive metal such as gold, silver, copper, aluminum, iron, titanium and platinum, and alloys thereof. The metal layer 403 may have electrical conductivity σ equal to or higher than $2.38 \times 10^6$ S/m at 20° C., and may preferably have electrical conductivity G equal to or higher than $3.5 \times 10^7$ S/m at 20° C. The metal layer 403 may have a thickness greater than or equal to $10^{-7}$ m along a Y axis normal to the upper surface of the metal layer 403.

The preset interval d between the resonator 401 and the metal layer 403 along the Y axis may be within a range of 0.1 mm to 4.0 mm, and a condition where W/d<1 is satisfied. In this condition, the impedance $Z_0$ of the resonator 401 may be determined by Equation (1), above. The line width W of the resonator 401 is smaller than the preset interval d.

In an embodiment of the present invention, since Equation (1) is applied, the variation in the impedance of the resonator 401 is small. Accordingly, the shielding member may be minimally used or may not be used, as described below.

Figure 6A:
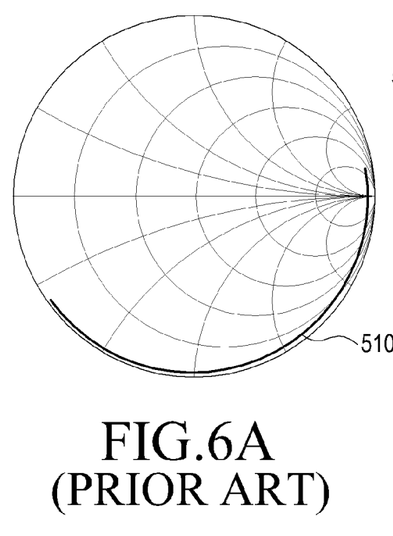
FIGS. 6A-6B are Smith charts for a resonant structure of a power transmission unit or a power reception unit according to an embodiment of the present invention, comparing a metal object not being provided with a metal object being provided around the resonator, respectively.
Figure 6B:
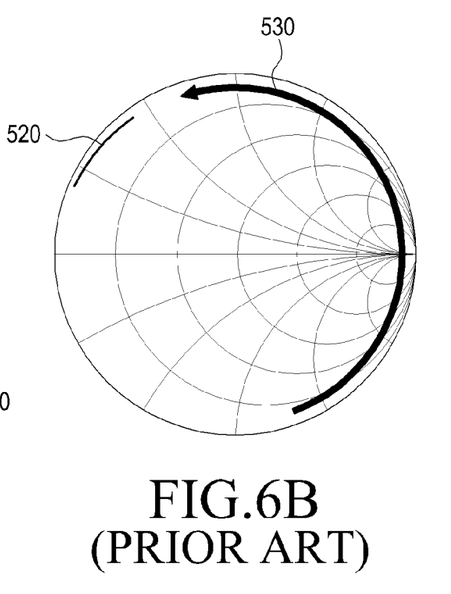

FIGS. 6A-6B are Smith charts for a resonant structure of a power transmission unit or a power reception unit according to the embodiment of the present invention as shown in FIG. 3 comparing a metal object not being provided with a metal object being provided around the resonator, respectively. In the Smith charts, a diameter of a circle starting from the right side denotes a real part, and a curved line spread from an end of the right side toward the other side denotes an imaginary part. The Smith charts show a relation between a reflection coefficient and the impedance of the resonator.

FIG. 6A illustrates an S11 parameter trajectory 510 showing an input complex reflection coefficient or the impedance of the resonator among scattering parameters when a metal object does not exist around the resonator.

FIG. 6B illustrates a S11 parameter trajectory 520 when a metal object exists around the resonator.

As shown by item 530 of FIG. 6B, the S11 parameter trajectory is rotated in a counterclockwise direction as the metal object exists around the resonator, which shows that the inductance value of the resonator sharply decreases.

Figure 7A:
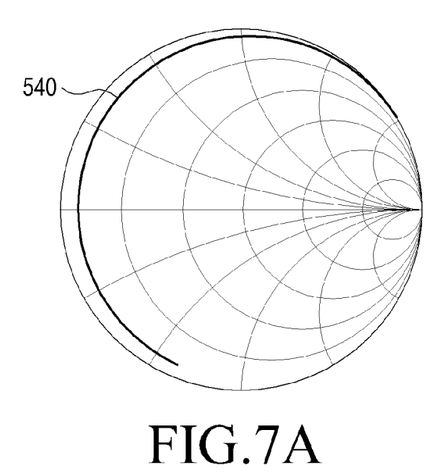
FIGS. 7A-7B are Smith charts for a resonant structure of a power transmission unit or a power reception unit according to an embodiment of the present invention comparing a metal object not being provided with a metal object being provided around the resonator, respectively.
Figure 7B:
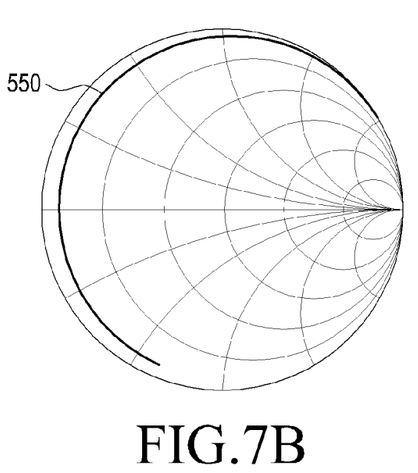

FIGS. 7A-B are Smith charts for a resonant structure of a power transmission unit or a power reception unit according to the another embodiment of the present invention as shown in FIG. 5 comparing a metal object not being provided with a metal object being provided around the resonator, respectively.

FIG. 7A illustrates an S11 parameter trajectory 540 when a metal object does not exist around the resonator.

FIG. 7B illustrates an S11 parameter trajectory 550 when a metal object exists around the resonator.

As illustrated, the S11 parameter trajectory does not move when the metal object exists around the resonator, which shows that the impedance value of the resonator is not changed.

Figure 8:
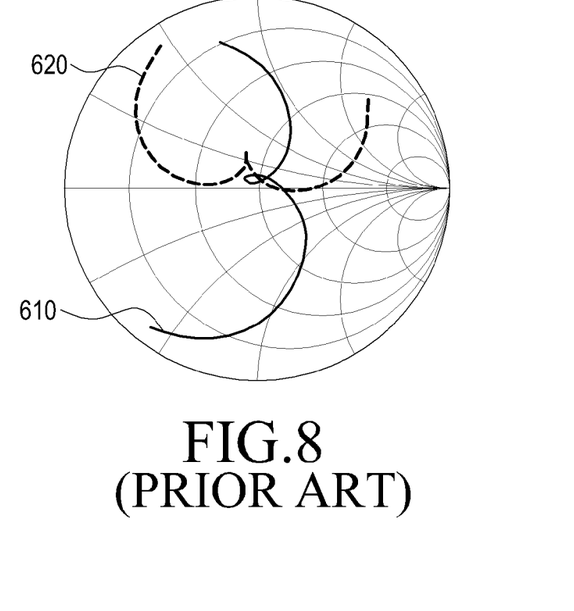
FIG. 8 is a Smith chart for a resonant structure of a power transmission unit or a power reception unit according to an embodiment of the present invention with a metal object not being provided around the resonator.

FIG. 8 is a Smith chart for a resonant structure of a power transmission unit or a power reception unit according to the embodiment of the present invention as shown in FIG. 3 with a metal object not being provided around the resonator.

FIG. 8 illustrates an S11 parameter trajectory 610 when a metal object does not exist around the resonator, and an S22 parameter trajectory 620 showing an output complex reflection coefficient or an output impedance of the resonator among S parameters.

In this embodiment, the S11 parameter and the S22 parameter cannot be measured when a metal object exists around the resonator.

Figure 9A:
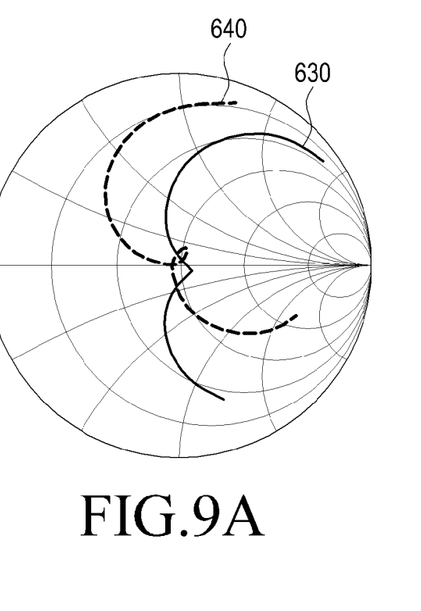
FIGS. 9A-9B are Smith charts for a resonant structure of a power transmission unit or a power reception unit according to an embodiment of the present invention, comparing a metal object not being provided with being provided around the resonator, respectively.
Figure 9B:
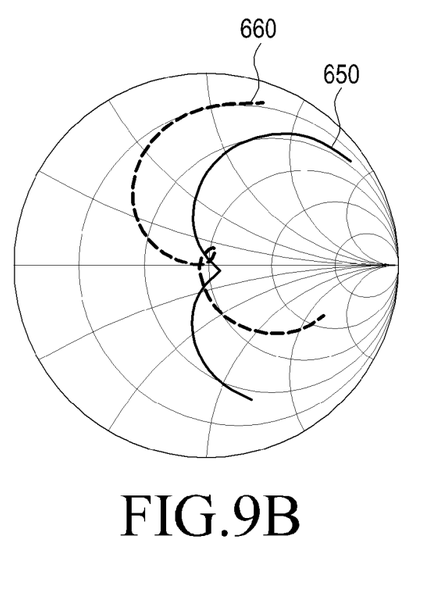

FIGS. 9A-9B are Smith charts for a resonant structure of a power transmission unit or a power reception unit according to the another embodiment of the present invention as shown in FIG. 5 comparing a metal object not being provided with being provided around the resonator, respectively.

FIG. 9A illustrates an S11 parameter trajectory 630 and an S22 parameter trajectory 640 when a metal object does not exist around the resonator.

FIG. 9B illustrates an S11 parameter trajectory 650 and an S22 parameter trajectory 660 when a metal object exists around the resonator.

As illustrated by FIGS. 9A-9B, the S11 parameter trajectory and the S22 parameter trajectory do not move regardless of whether a metal object exists around the resonator, which shows that the impedance value of the resonator is hardly changed. Further, a difference $\Delta S_{21}$ in an S21 parameter showing a forward complex transmission coefficient among S parameters corresponds to −0.03 dB, which shows an extremely small difference.

Figure 10:
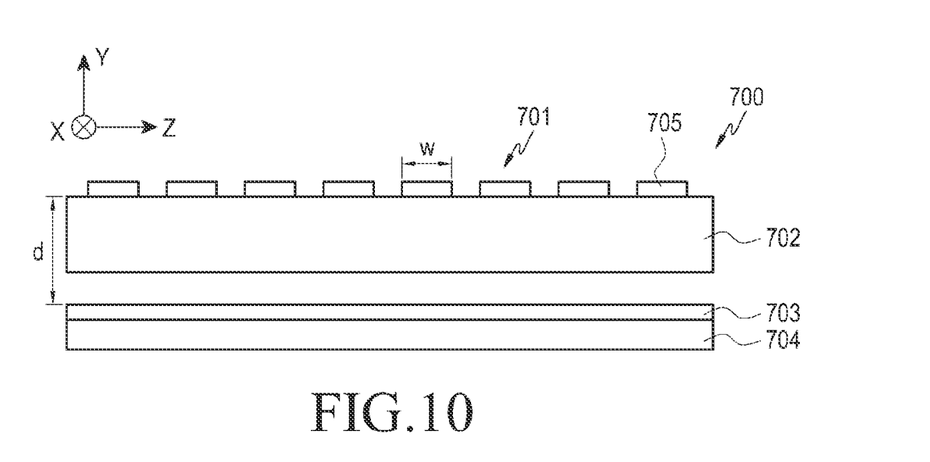
FIG. 10 is a view illustrating a resonant structure of a power transmission unit or a power reception unit according to another embodiment of the present invention.

FIG. 10 is a view illustrating a resonant structure 700 of a power transmission unit or a power reception unit according to another embodiment of the present invention. Since the resonant structure 700 according to this embodiment of the present invention is different from the resonant structure 400 illustrated in FIG. 5 in that a metal layer is formed at a separate substrate, and duplicate descriptions of common components will be omitted for conciseness.

The resonant structure 700 of the power transmission unit or the power reception unit includes a resonator 701, a mechanism 702, a metal layer 703, and an auxiliary substrate 704.

The resonator 701 is formed with a conductive line or conductive lines 705 having a preset pattern such as a loop and a spiral, with each of the conductive lines 705 having a line width of W along a Z axis parallel to an upper surface of the metal layer 703.

The resonator 701 is formed on an upper surface of the mechanism 702.

The metal layer 703 is formed on an upper surface of the auxiliary substrate 704, with the mechanism 702 and the metal layer 703 being spaced apart from each other. That is, an air layer is provided between the mechanism 702 and the metal layer 703. The preset interval d between the resonator 401 and the metal layer 403 along a Y axis normal to the upper surface of the metal layer 403 may be greater than or equal to $10^{-7}$ m, and preferably within a range of 0.1 mm to 4.0 mm, with a condition of W/d<1 being satisfied.

Figure 11:
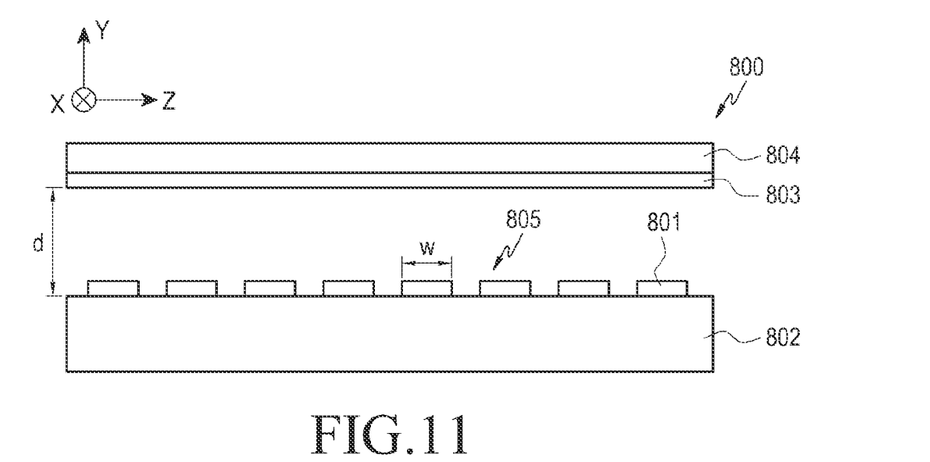
FIG. 11 is a view illustrating a resonant structure of a power transmission unit or a power reception unit according to yet another embodiment of the present invention.

FIG. 11 is a view illustrating a resonant structure of a power transmission unit or a power reception unit according to yet another embodiment of the present invention. Since a resonant structure 800 according to this embodiment of the present invention is only different from the resonant structure 400 illustrated in FIG. 5 in that a metal layer is formed on a separate substrate and an overall arrangement thereof is changed, duplicate descriptions will be omitted.

The resonant structure 800 of the power transmission unit or the power reception unit includes a resonator 801, a mechanism 802, and a metal layer 803, and an auxiliary substrate 804.

The resonator 801 is formed with a conductive line or conductive lines 805 having a preset pattern such as a loop and a spiral, with each of the conductive lines 805 having a line width of W along a Z axis parallel to a lower surface of the metal layer 803.

The resonator 801 is formed on an upper surface of the mechanism 802.

The metal layer 803 is formed on a lower surface of the auxiliary substrate 804, with the resonator 801 and the metal layer 803 being spaced apart from each other. That is, an air layer is provided between the resonator 801 and the metal layer 803. The preset interval d between the resonator 801 and the metal layer 803 along a Y axis normal to the lower surface of the metal layer 403 may be equal to or greater than $10^{-7}$ m, and preferably within a range of 0.1 mm to 4.0 mm, with a condition of W/d<1 being satisfied.

As described above, since a wireless power transmitter and/or a wireless power receiver having a resonant structure according to at least one embodiment of the present invention includes a resonator spaced apart from a metal layer by a constant interval and having a high impedance matching with a specific impedance, the impedance is hardly changed by a metal object even when the metal object such as a metal plate is provided around the wireless power transmitter or the wireless power receiver. Thus, a power transmission characteristic of the resonator is maintained. The resonator may have a high inductance value and may be adjusted to be resonated at a specific frequency. In adjusting characteristics of the resonator, elements such as a capacitor connected to the resonator may be used. For example, an impedance of the resonator may be set or optimized to meet a demand in the wireless charging system through adjusting a capacitance value of the capacitor connected to the resonator and specific values of other impedance adjustment elements.

According to an embodiment of the present invention, there is provided a wireless power transmitter and/or a wireless power receiver which can prevent the change in characteristics caused by peripheral metal objects while minimally using an electromagnetic shielding member or not using the electromagnetic shielding member.

According to an embodiment of the present invention, there is provided a wireless power transmitter and/or a wireless power receiver of which manufacturing cost is minimized since an electromagnetic shielding member is minimally used or is not used.

While the present invention has been shown and described with reference to certain embodiments thereof, it will be understood by those skilled in the art that various changes in form and details may be made therein without departing from the spirit and scope of the present invention as defined by the appended claims. Therefore, various modified implementations can be made without departing from the substance of the present invention claimed in the appended claims, and the modified implementations should not be construed separately from the technical idea or prospect of the present invention.

What is claimed is:

1. A wireless power transmitter comprising:
    a resonator that includes conductive lines configured to provide electric power to a wireless power receiver; and
    a metal layer that includes an upper surface spaced apart from the resonator by a preset interval,
    wherein a line width of conductive lines of the resonator is smaller than the preset interval.

2. The wireless power transmitter of claim 1, wherein the line width of the conductive lines of the resonator is less than or equal to 4.0 mm, and an interval between the conductive lines of the resonator is less than or equal to 4.0 mm.

3. The wireless power transmitter of claim 1, further comprising a mechanism having an upper surface on which the resonator is formed,
    wherein the mechanism is formed of a dielectric material.

4. The wireless power transmitter of claim 1, wherein an air layer is provided between the resonator and the metal layer.

5. The wireless power transmitter of claim 1, wherein the metal layer is formed of one of gold, silver, copper, aluminum, iron, titanium, platinum and an alloy of one of gold, silver, copper, aluminum, iron, titanium and platinum.

6. The wireless power transmitter of claim 1, wherein the metal layer has electrical conductivity greater than or equal to $2.38 \times 10^6$ S/m at 20° C.

7. The wireless power transmitter of claim 1, wherein the metal layer has electrical conductivity greater than or equal to $3.5 \times 10^7$ S/m at 20° C.

8. The wireless power transmitter of claim 1, wherein the preset interval between the resonator and the upper surface of the metal layer is within a range of 0.1 mm to 4.0 mm.

9. The wireless power transmitter of claim 1, wherein the line width of each of the conductive lines is within a range of 0.1 mm to 4.0 mm, an interval between the conductive lines is within a range of 0.1 mm to 4.0 mm, and the preset interval between the resonator and the upper surface of the metal layer is within a range of 0.1 mm to 4.0 mm.

10. A wireless power receiver comprising:
    a resonator that includes conductive lines configured to receive electric power from a wireless power transmitter; and
    a metal layer that includes an upper surface spaced apart from the resonator by a preset interval,
    wherein a line width of conductive lines of the resonator is smaller than the preset interval.

11. The wireless power receiver of claim 10, wherein the line width of the conductive lines of the resonator is less than or equal to 4.0 mm, and an interval between the conductive lines of the resonator is less than or equal to 4.0 mm.

12. The wireless power receiver of claim 10, further comprising a mechanism having an upper surface on which the resonator is formed,
   wherein the mechanism is formed of a dielectric material.

13. The wireless power receiver of claim 10, wherein an air layer is provided between the resonator and the metal layer.

14. The wireless power receiver of claim 10, wherein the metal layer is formed of one of gold, silver, copper, aluminum, iron, titanium, platinum and an alloy of one of gold, silver, copper, aluminum, iron, titanium and platinum.

15. The wireless power receiver of claim 10, wherein the metal layer has electrical conductivity greater than or equal to $2.38 \times 10^6$ S/m at 20° C.

16. The wireless power receiver of claim 10, wherein the metal layer has electrical conductivity greater than or equal to $3.5 \times 10^7$ S/m at 20° C.

17. The wireless power receiver of claim 10, wherein the preset interval between the resonator and the upper surface of the metal layer is within a range of 0.1 mm to 4.0 mm.

18. The wireless power receiver of claim 10, wherein the line width of each of the conductive lines is within a range of 0.1 mm to 4.0 mm, an interval between the conductive lines is within a range of 0.1 mm to 4.0 mm, and the preset interval between the resonator and the upper surface of the metal layer is within a range of 0.1 mm to 4.0 mm.

* * * * *